United States Patent Office 3,781,263
Patented Dec. 25, 1973

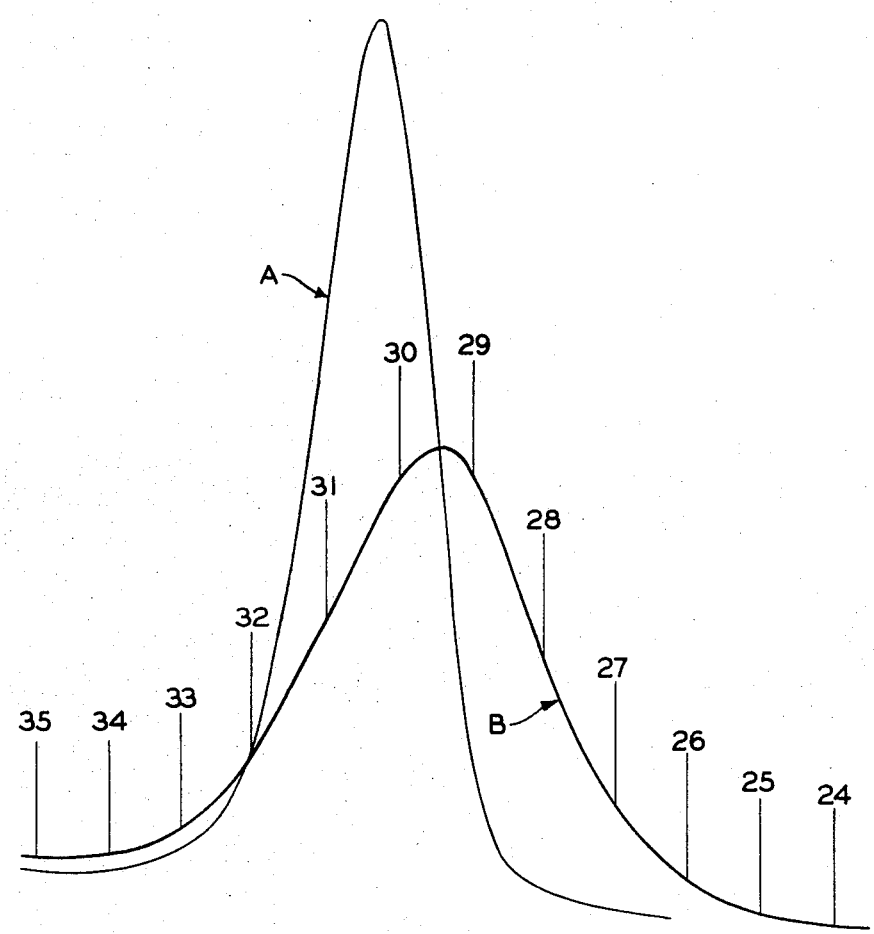

3,781,263
PROCESS FOR METALATION
Adel F. Halasa, Bath, and George B. Mitchell, Canton, Ohio, assignors to The Firestone Tire & Rubber Company, Akron, Ohio
Filed July 13, 1972, Ser. No. 271,474
Int. Cl. C08d 5/02
U.S. Cl. 260—94.7 A         4 Claims

ABSTRACT OF THE DISCLOSURE

Polymers and copolymers of conjugated dienes (butadiene, isoprene, etc.) and copolymers of such a conjugated diene with a vinyl aromatic hydrocarbon (styrene, etc.) are metalated with an alkyl lithium, e.g. butyllithium, together with potassium hydroxide or potassium oxide or a potassium salt of an inorganic acid.

---

The invention relates to a novel method of metalating rubber homopolymers and copolymers of conjugated dienes containing 4 to 6 carbon atoms, and copolymers of one or more such conjugated dienes with one or more vinyl aromatic monomers. The copolymers that are treated may be either random copolymers or block copolymers. The metalated products may be used where other metalated polymers have been used, as in the production of hydrocarbons by reaction with a metal halide, and they may have other uses.

The metalation of such rubbers with butyllithium and a polar compound, e.g. an ether or amine, etc. is disclosed in Naylor 3,492,369. The use of (1) an organolithium compound and (2) a selected organic compound of sodium, potassium, rubidium or cesium as a polymerization initiator is disclosed in Wofford 3,294,768.

In the metalation of rubbers by known procedures, the rubber is depolymerized as evidenced, for instance, by loss of resistance to cold flow and loss in molecular weight. Such loss is prevented or reduced by using a mixture of (1) alkyllithium (preferably n-butyllithium) and (2) potassium hydroxide, oxide, a halide or phosphate. Thus, for each 100 parts by weight of polymer there are used: 0.001 to 2 parts (and preferably 0.002 to 0.2 part) of lithium as alkyllithium which contains 4 to 8 carbon atoms; 0.01 to 20 parts (and preferably 0.1 to 10 parts) of KOH, $K_2O$, KCl or $K_3PO_4$.

The metalated polymers and copolymers are useful for the production of graft copolymers, and for this purpose it is immaterial whether lithium or potassium or a mixture of these metals constitutes the metal of the metalated rubber. The grafts can be formed by reacting the metalated polymer or copolymer of this invention with an alkyl halide (in which the alkyl group contains 4 to 8 or more carbon atoms) or a monomer (e.g. a conjugated diene such as butadiene, isoprene, etc. or other aliphatic hydrocarbon monomers, e.g. ethylene, propylene, isobutylene, etc. or a vinyl aromatic monomer, e.g. styrene, alpha-methylstyrene, etc. or other polar monomers, e.g. acrylonitrile, methylarylate, vinyl ethers, vinyl sulfones, etc.).

The metalation is carried out at any usual metalating temperature such as 0° to 150° C. A preferred temperature range is 25° to 60° C. The solvent used is a solvent such as a hydrocarbon aliphatic solvent, usually employed in the polymerization of monomers in the production of rubber using butyllithium as the catalyst. Such solvents are saturated paraffinic hydrocarbons or aliphatic cyclo hydrocarbons containing 5 to 10 carbon atoms. The potassium co-metalating agent may be dispersed in such a hydrocarbon or it may be dispersed in a mineral oil.

It has been recognized that rubber polymers lose molecular weight during the known metalation reactions. See, for instance, "Metalation of Unsaturated Polymers and Formation of Graft Polymers," by authors which include one of the co-inventors, published in the Journal of Polymer Science, Part A–1, vol. 9, pages 139–45 (1971). On page 142 there is a table which shows that during metalation there is loss in the molecular weight of polybutadiene and polyisoprene with resultant decrease in intrinsic viscosity. The article refers to low metalation levels, but there is also a loss in molecular weight with higher metalation levels. When potassium hydroxide or other potassium compound to which the invention relates is used along with butyllithium, the polymers and copolymers are not degraded, and no objectionable gel is formed. The microstructure of the resulting grafted copolymer is typical of diene polymerization initiated by alkyllithium in a hydrocarbon solvent. However, these grafted copolymers because they are branched and therefore have a broad molecular weight distribution, have the advantage of less cold flow, better processability and better wear wet-traction properties characteristic of graft copolymers. They are useful in the manufacture of tires and other rubber goods.

EXAMPLE 1

In producing the graft copolymer of this example, three samples of butadiene were polymerized, the polymers were metalated, and then the metalated polymers were treated with butadiene to produce the graft copolymer. The processes were substantially identical, the differences being indicated in the following table which refers to the steps by which the three graft copolymers were produced and gives the properties of the three products. In the table, BD stands for butadiene, n-BuLi stands for n-butyllithium, and t-BuLi stands for t-butyllithium. For the polymerization, other alkyllithiums may be used including alkyls with 4 to 8 carbon atoms. For the metalation, an active alkyllithium is required in which the lithium is in the secondary or tertiary position, if the alkyl group is butyl. In the metalation and grafting steps, additional heptane is sometimes used to dilute the reaction mixture because in the formula given for the polymerization a viscous product was often obtained which is difficult to handle in the subsequent steps of the operation. Example 3 illustrates the addition of heptane to the polymerization reaction mixture. In indicating the properties of the polymer and the graft, DSV stands for dilute solution viscosity, and IR stands for infra red analysis.

TABLE I

| Run | A | B | C |
|---|---|---|---|
| Polymerization: | | | |
| Blend: | | | |
| Butadiene, g | 168 | 168 | 168 |
| Heptane, g | 632 | 632 | 632 |
| n-BuLi, mm./100 b./d | 0.6 | 0.6 | 0.6 |
| Temperature, °C | 60 | 60 | 60 |
| Time, hours | 4 | 4 | 5.5 |
| Properties of polymer: | | | |
| DSV | 2.09 | 2.39 | 2.57 |
| Percent gel | 0 | 0 | 0 |
| IR: | | | |
| cis-1,4% | 37.2 | 37.5 | 39.1 |
| trans-1,4% | 53.9 | 53.9 | 52.1 |
| 1,2% | 8.9 | 8.7 | 8.8 |
| Metalation: | | | |
| Heptane added, g | 700 | 700 | 700 |
| Metalating agent: | | | |
| t-BuLi, mmol./100 g. pol | 6.0 | 6.0 | 6.0 |
| KOH, mmol./100 g. pol | 6.6 | 6.6 | 6.6 |
| Temperature, °C | 55 | 55 | 55 |
| Time, hours | 16 | 16 | 16 |
| Grafting: | | | |
| Heptane added, g | 300 | 0 | 0 |
| Blend: | | | |
| Butadiene, g | 112 | 112 | 112 |
| Heptane, g | 428 | 428 | 428 |
| Temperature, °C | 50 | 55 | 55 |
| Time, hours | 4.5 | 3 | 3.5 |
| Properties of graft copolymer: | | | |
| DSV | 3.05 | 3.81 | 3.57 |
| Percent gel | 0 | 0 | 0 |
| IR: | | | |
| cis-1,4% | 36.9 | 36.8 | 36.8 |
| trans-1,4% | 53.7 | 54.3 | 54.1 |
| 1,2% | 9.3 | 8.9 | 9.1 |

The drawing shows the different molecular weight distributions of a backbone polymer (Curve A) and the graft copolymer of Run A (Curve B).

The three graft polymers obtained in this way were mixed on a cool mill (15–25° C.) approximately equal parts of each being used. The properties of the mixture referred to herein as the material used in Example 2, were as follows:

DSV—3.54
Percent Gel—0
$T_g$*— —97° C.
ML/4/212° F.—175
IR:
    cis-1,4%—36.2
    trans-1,4%—54.8
    1,2%—9.0

*$T_g$ stands for glass transition temperature.

EXAMPLE 2

The mixture of grafts was then compounded according to the following recipe:

| | Parts by weight |
|---|---|
| Polymer | 100 |
| ISAF Black | 70 |
| Oil | 43 |
| Zinc oxide | 2.5 |
| Stearic acid | 2.0 |
| Antioxidant | 1.0 |
| Sulfur | 1.7 |
| Accelerator | 1.4 |

The polymer was vulcanized at 300° F. and tests were made on samples vulcanized at this temperature for the times indicated. The properties of the vulcanizate are recorded in the following table.

TABLE II

ML/4/212° F. [1]—164
Tensile strength (23' cure) [2]—1625 p.s.i.
Ultimate elongation (23' cure) [2]—250%
Steel ball rebound (35' cure): [3]
    at 73° F.—49%
    at 212° F.—60%
Young's modulus index: [4]
    at 10,000 p.s.i.—<—70° C.

ASTM and literature references:
  [1] ASTM Designation D1646–68.
  [2] ASTM Designation D412–68.
  [3] Dillon, J. H., Prettyman, I. B., Hall, G. L. J. Appl. Phys. 15, 309 (1944).
  [4] ASTM Designation D797–64.

EXAMPLE 3

Four other polybutadienes were produced by the procedure indicated in Table II, and these were metalated and graft copolymers were produced. In producing the graft, only 35 parts of butadiene (BD) was grafted onto 100 parts by weight of metalated polybutadiene backbone. The details of the procedures are given in the following table.

TABLE III

| Run | D | E | F | G |
|---|---|---|---|---|
| Polymerization: | | | | |
| Blend: | | | | |
|   Butadiene, g | 182 | 200 | 200 | 200 |
|   Heptane, g | 618 | 700 | 700 | 700 |
| n-BuLi, mm./100 g. b./d | 1.0 | 0.9 | 0.9 | 0.85 |
| Heptane, g | 0 | [1] 800 | [2] 800 | 800 |
| Temperature, ° C | 60 | (¹) | (²) | 60 |
| Time, hours | 5 | (¹) | (²) | 5 |
| Properties of polymer: | | | | |
|   DSV | 1.26 | 1.47 | 1.53 | 1.57 |
|   Percent gel | 0 | 0 | 0 | 0 |
| IR: | | | | |
|   cis-1,4% | 35.2 | 37.3 | 38.3 | 36.2 |
|   trans-1,4% | 56.1 | 54.3 | 53.4 | 54.9 |
|   1,2% | 8.7 | 8.4 | 8.2 | 8.9 |
| Metalation: | | | | |
|   Heptane added, g | 800 | 0 | 0 | 0 |
|   Metalating agent: | | | | |
|     t-BuLi, mmol./100 g. pol | 6.0 | 6.0 | 6.0 | 6.0 |
|     KOH, mmol./100 g. pol | 6.6 | 6.6 | 6.6 | 6.6 |
| Temperature, ° C | 50 | 50 | 50 | 50 |
| Time, hours | 18 | 24 | 24 | 16 |
| Grafting: | | | | |
| Blend: | | | | |
|   Butadiene, g | 61 | 65 | 68 | 66 |
|   Heptane, g | 214 | 223 | 242 | 234 |
| Temperature, ° C | 50 | 50 | 50 | 50 |
| Time, hours | 2 | 2 | 2.5 | 2.5 |
| Properties of graft copolymer: | | | | |
|   DSV | 1.37 | 1.73 | 1.48 | 1.59 |
|   Percent gel | 0 | 0 | 0 | 0 |
| IR: | | | | |
|   cis-1,4% | 35.2 | 36.4 | 38.2 | 37.7 |
|   trans-1,4% | 55.9 | 54.8 | 53.4 | 53.7 |
|   1,2% | 8.9 | 8.9 | 8.4 | 8.7 |

[1] (3 hours at 60° C.) (16 hours at 50° C.).
[2] (6 hours at 60° C.) (17 hours at 46° C.).

Substantially equal amounts of graft polymer produced in the four different runs were blended on a cold mill and the properties of this graft copolymer are given in the following table.

DSV—1.55
Percent gel—0
$T_g$*— —98° C.
ML/4/212° F.—27
IR:
    cis-1,4%—35.6
    trans-1,4%—55.7
    1,2%—8.7
*See Example 1.

EXAMPLE 4

The mixture of graft polymers was then blended according to the foregoing recipe and on curing at 300° F. a vulcanizate was obtained which had the following properties:

TABLE IV

ML/4/212° F.[1]—36
Tensile strength (23'cure) [1]—1875 p.s.i.
Ultimate elongation, percent (23' cure) [1]—470
Steel ball rebound (35' cure) [1]:
    at 73° F.—40%
    at 212° F.—49%
Young's modulus index at 10,000 p.s.i.[1]— <—70° C.

[1] See Table II.

EXAMPLE 5

Butadiene prepared in substantially the same manner as in the preceding examples was metalated with t-butyllithium and potassium hydroxide in much the same manner as the preceding examples, except exactly twice as much of the metalating agents was employed at substantially the same temperature—between 50 and 60° C.—until the metalation reaction was complete.

Styrene was grafted on to the metalated polybutadiene by adding 25 parts of styrene per each 100 parts of the metalated polybutadiene backbone at 50° C. for 2 hours. The properties of the graft copolymer are given in the following table:

TABLE V

DSV—1.55
Percent gel—0
ML/4/212° F.—126
$T_g$— —97° C.
IR:
    cis-1,4%—30.6
    trans-1,4%—42.8
    1,2%—6.2
    Styrene, percent—20.3

Other backbone polymers may be produced from other monomers as above indicated, and these may be metalated with KOH, $K_2O$, KCl or $K_3PO_4$ to produce metalated backbones which may be reacted with a conjugated diene, an alkyl halide, an aliphatic hydrocarbon monomer, a vinyl aromatic monomer, or a polar monomer within substantially the same temperature range above indicated to produce other products for use in tires or mechanical goods, etc.

We claim:

1. The process of metalating a homopolymer of a conjugated diene containing 4 to 6 carbon atoms or a copolymer of such a diene and a vinyl aromatic monomer, which process comprises reacting at 0° to 150° C. in a hydrocarbon aliphatic solvent, 100 parts of the homopolymer or copolymer with 0.001 to 2 parts of a secondary or tertiary alkyllithium which contains 4 to 8 carbon atoms and 0.01 to 20 parts of a modifier of the class consisting of potassium hydroxide, potassium oxide and potassium salts of an inorganic acid of the class consisting of the halides and the phosphates.

2. The process of claim 1 in which polybutadiene is metalated.

3. The process of claim 1 in which the metalation temperature is 25 to 60° C.

4. The process of claim 1 in which the modifier is potassium hydroxide.

References Cited

FOREIGN PATENTS

| 873,656 | 7/1961 | Great Britain | 260—94.2 |
| 1,478,225 | 3/1967 | France | 260—877 X |
| 1,144,151 | 3/1969 | Great Britain | 260—877 X |

JOSEPH L. SCHOFER, Primary Examiner

W. F. HAMROCK, Assistant Examiner

U.S. Cl. X.R.

260—85.1, 94.7 HA

UNITED STATES PATENT OFFICE
CERTIFICATE OF CORRECTION

Patent No. 3,781,263     Dated December 25, 1973

Inventor(s) Adel F. Halasa and George B. Mitchell

It is certified that error appears in the above-identified patent and that said Letters Patent are hereby corrected as shown below:

Column 2, Line 52 (in Table I), "b./d" should read --BD--.

Column 3, Line 65 (in Table III), "b./d" should read --BD--.

Signed and sealed this 16th day of April 1974.

(SEAL)
Attest:

EDWARD M. FLETCHER, JR.
Attesting Officer

C. MARSHALL DANN
Commissioner of Patents